United States Patent
Oumi

(10) Patent No.: US 10,500,724 B2
(45) Date of Patent: Dec. 10, 2019

(54) ROBOT TEACHING DEVICE FOR CORRECTING ROBOT TRAJECTORY

(71) Applicant: FANUC CORPORATION, Yamanashi (JP)

(72) Inventor: Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 2 days.

(21) Appl. No.: 16/006,900

(22) Filed: Jun. 13, 2018

(65) Prior Publication Data
US 2018/0361575 A1 Dec. 20, 2018

(30) Foreign Application Priority Data
Jun. 14, 2017 (JP) ................................ 2017-116942

(51) Int. Cl.
*B25J 9/16* (2006.01)
*G05B 19/425* (2006.01)

(52) U.S. Cl.
CPC ............ *B25J 9/163* (2013.01); *B25J 9/1664* (2013.01); *B25J 9/1666* (2013.01); *B25J 9/1674* (2013.01); *G05B 19/425* (2013.01); *G05B 2219/36416* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 5,397,865 A * | 3/1995 | Park | ........................ | G06F 3/016 178/18.05 |
| 6,157,873 A * | 12/2000 | DeCamp | ................ | B25J 9/1671 700/186 |
| 6,167,328 A * | 12/2000 | Takaoka | ................. | B25J 9/1671 318/568.1 |
| 7,181,315 B2 * | 2/2007 | Watanabe | .............. | B25J 9/1671 318/568.11 |
| 7,457,698 B2 * | 11/2008 | Danko | ................... | B25J 9/1607 701/50 |
| 7,714,895 B2 * | 5/2010 | Pretlove | ................. | B25J 9/1656 348/115 |
| 9,052,710 B1 * | 6/2015 | Farwell | ................ | G05B 19/423 |

(Continued)

FOREIGN PATENT DOCUMENTS

| | | |
|---|---|---|
| JP | S63-250709 A | 10/1988 |
| JP | H2-38130 U | 3/1990 |

(Continued)

*Primary Examiner* — Jonathan L Sample
(74) *Attorney, Agent, or Firm* — Hauptman Ham, LLP

(57) ABSTRACT

A teaching device is provided with a trajectory generating unit which generates a robot trajectory based on a start point and an end point, a determination unit which determines the advance direction of an operation tool with respect to a workpiece, and a correction unit which corrects the robot trajectory. The determination unit determines whether or not the advance direction of the operation tool is a predetermined direction with respect to the rotational direction of a tool. The correction unit corrects the robot trajectory by replacing the start point and the end point with each other when the advance direction of the operation tool is different from the predetermined direction.

1 Claim, 9 Drawing Sheets

(56) References Cited

U.S. PATENT DOCUMENTS

| | | | | |
|---|---|---|---|---|
| 2002/0169522 A1* | 11/2002 | Kanno | ............ | B25J 9/1666 |
| | | | | 700/245 |
| 2003/0120391 A1* | 6/2003 | Saito | ............ | B25J 9/1671 |
| | | | | 700/264 |
| 2004/0199288 A1* | 10/2004 | Watanabe | ............ | B25J 9/1671 |
| | | | | 700/245 |
| 2006/0293617 A1* | 12/2006 | Einav | ............ | A61H 1/0274 |
| | | | | 601/33 |
| 2007/0282228 A1* | 12/2007 | Einav | ............ | A63B 21/4021 |
| | | | | 601/33 |
| 2010/0286826 A1* | 11/2010 | Tsusaka | ............ | B25J 9/1633 |
| | | | | 700/254 |
| 2013/0044115 A1* | 2/2013 | Oyama | ............ | G05B 19/4068 |
| | | | | 345/473 |
| 2013/0310977 A1* | 11/2013 | Tsusaka | ............ | B25J 9/1656 |
| | | | | 700/257 |
| 2014/0114477 A1* | 4/2014 | Sato | ............ | B25J 9/1664 |
| | | | | 700/250 |
| 2015/0290795 A1* | 10/2015 | Oleynik | ............ | G05B 19/42 |
| | | | | 700/257 |
| 2016/0332297 A1* | 11/2016 | Sugaya | ............ | B25J 9/161 |
| 2017/0165841 A1* | 6/2017 | Kamoi | ............ | B25J 9/1697 |
| 2017/0210008 A1* | 7/2017 | Maeda | ............ | B25J 9/0087 |
| 2017/0341234 A1* | 11/2017 | Murata | ............ | B25J 9/1692 |
| 2017/0361464 A1* | 12/2017 | Sasaki | ............ | B25J 9/1641 |

FOREIGN PATENT DOCUMENTS

| | | |
|---|---|---|
| JP | H4-85606 A | 3/1992 |
| JP | H4-111103 A | 4/1992 |
| JP | 5-165509 A | 7/1993 |
| JP | 6-250721 A | 9/1994 |
| JP | H6-282325 A | 10/1994 |
| JP | H10-20917 A | 1/1998 |
| JP | 2000-20115 A | 1/2000 |
| JP | 2011-48621 A | 3/2011 |
| JP | 2015-9324 A | 1/2015 |
| KR | 10-2009-0107827 A | 10/2009 |

* cited by examiner

ROBOT TEACHING DEVICE FOR CORRECTING ROBOT TRAJECTORY

RELATED APPLICATIONS

The present application claims priority of Japanese Application Number 2017-116942, filed on Jun. 14, 2017, the disclosure of which is hereby incorporated by reference herein in its entirety.

BACKGROUND OF THE INVENTION

1. Field of the Invention

The present invention relates to a robot teaching device for correcting a robot trajectory.

2. Description of Related Art

In general, when an operation program for operating a robot is created, an operator uses a teaching operation board so as to drive an actual robot. The operator determines the position and orientation of an operation tool with respect to a workpiece before storing, as a teaching point, the position and orientation in a teaching device. The information on the teaching point includes the position and orientation of the robot. The operator sets a plurality of teaching points depending on the operation of the robot. Further, the teaching device generates the operation program so that, for example, a tool center point passes through the teaching points or the vicinity of the teaching points.

Alternatively, a method, in which models of a workpiece and a robot are input to a computer and a robot trajectory is set on a screen of the computer, has been known (see, for example, Japanese Unexamined Patent Publication No. 6-250721, Japanese Unexamined Patent Publication No. 2011-48621, and Japanese Unexamined Patent Publication No. 5-165509). In such an offline method for setting a trajectory, teaching points for a robot can be set even though the actual robot is not activated. Further, the computer can creates the operation program for the robot based on the teaching points after the teaching points are set.

SUMMARY OF INVENTION

In an operation tool attached to a robot, an advance direction of the operation tool with respect to a workpiece may be predetermined. For example, an operation tool having a rotary tool may be used in order to remove a burr of the workpiece. The operation tool is moved along the direction in which an edge part of the workpiece having the burr extends, whereby the burr can be removed. In this respect, an effect of removing the burr may differ depending on the advance direction of the operation tool. The operator has to take the advance direction of the operation tool with respect to the workpiece into consideration in order to efficiently remove the burr. Alternatively, in an operation tool, an advance direction of the operation tool with respect to a workpiece may be predetermined.

In an offline method for setting the robot trajectory, the operator can set any robot trajectory. However, the operator has to set many robot trajectories, and accordingly, may set an advance direction of the operation tool in a direction which is different from the desired direction. Further, the teaching device may automatically generate the trajectory based on, for example, a three-dimensional model of the workpiece. In this respect, the operator inputs a start point and an end point of the trajectory, but may set the advance direction of the operation tool in a direction which is different from the desired direction.

When the advance direction of the operation tool is different from the desired direction, an efficient operation cannot be performed. Further, the operator has to reset the robot trajectory when finding that the advance direction of the operation tool is not correct.

An aspect of the present disclosure provides an offline robot teaching device which generates a trajectory of a robot to which an operation tool including a rotary member rotating about a central axis is attached. The teaching device includes a display part which displays a workpiece. The teaching device includes a start point setting unit which sets a start point of a robot trajectory with respect to the workpiece displayed on the display part, and an end point setting unit which sets an end point of the robot trajectory with respect to the workpiece displayed on the display part. The teaching device includes a trajectory generating unit which generates the robot trajectory based on the start point and the end point, a determination unit which determines the advance direction of the operation tool with respect to the workpiece, and a correction unit which corrects the robot trajectory. The determination unit determines whether or not the advance direction is a predetermined direction with respect to the rotational direction of the rotary member. The correction unit corrects the robot trajectory by interchanging the start point and the end point when the advance direction is different from the predetermined direction.

DETAILED DESCRIPTION

With reference to FIGS. 1 to 10, a robot teaching device in an embodiment will be described. The robot teaching device in the present embodiment generates a robot trajectory by an offline method. A robot system in the present embodiment removes a burr which is generated by machining a workpiece.

Figure 1:
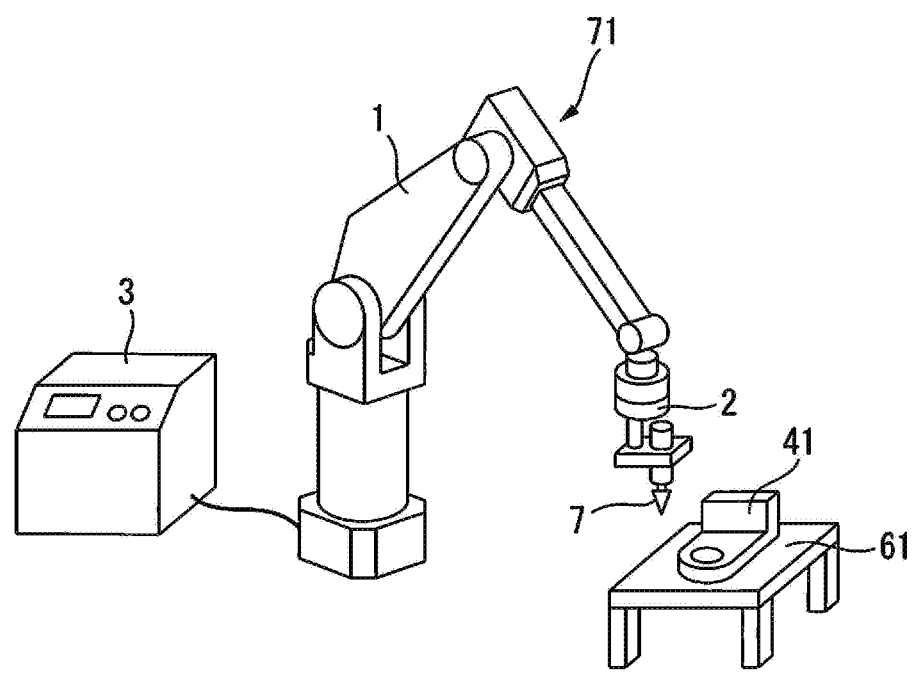
FIG. 1 is a schematic perspective view of a first robot device in an embodiment.
Figure 2:
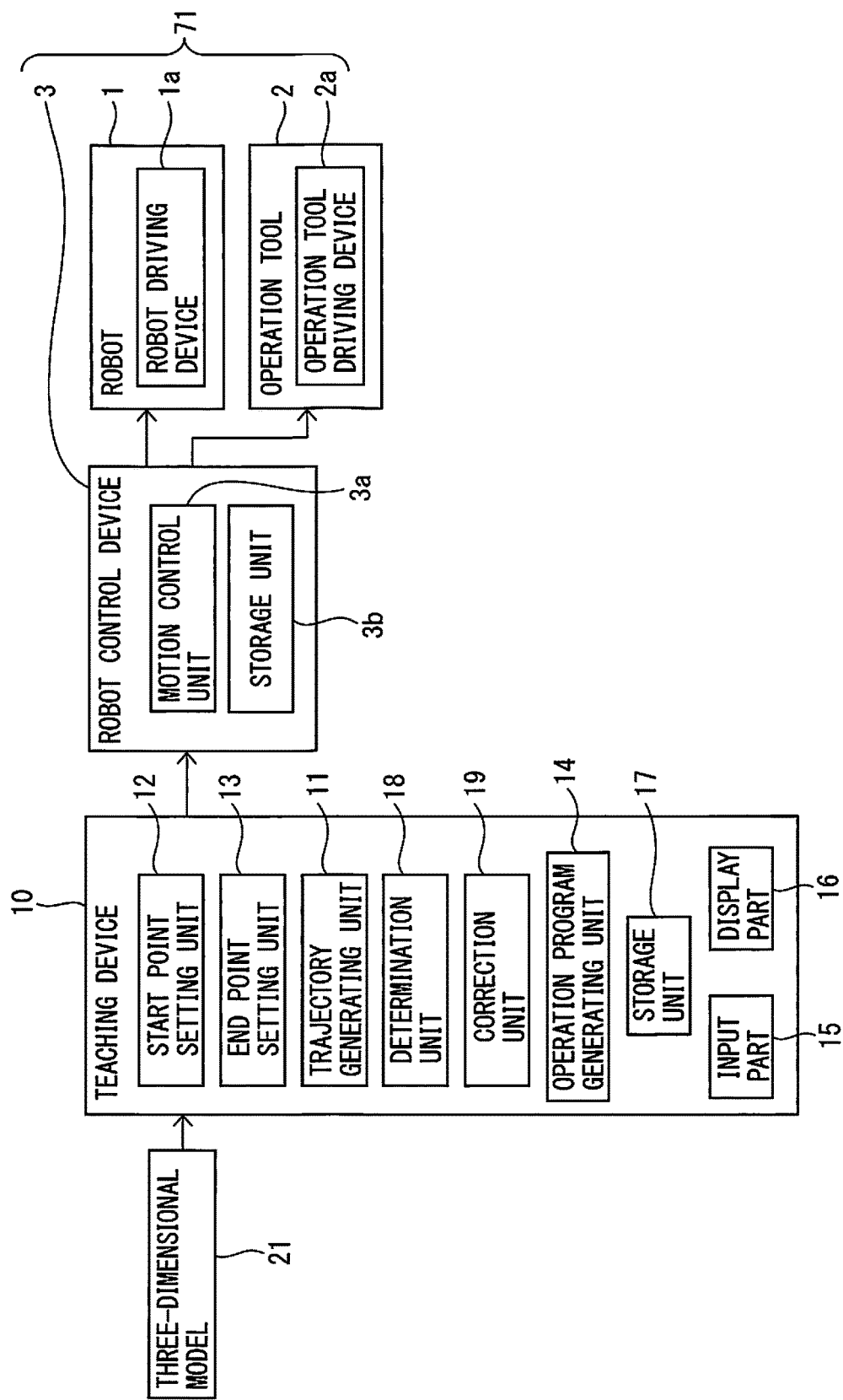
FIG. 2 is a block diagram of a robot system in the embodiment.

FIG. 1 shows a perspective view of a first robot device in the present embodiment. FIG. 2 shows a block diagram of the robot system in the present embodiment. With reference to FIGS. 1 and 2, the robot system in the present embodiment includes a first the robot device 71 and a teaching device 10. The first the robot device 71 is provided with an operation tool 2 which performs an operation for a workpiece 41, and a robot 1 which changes the position and orientation of the operation tool 2.

The workpiece 41 is secured to a pedestal 61. The robot 1 is an articulated robot which has a plurality of joint parts. The operation tool 2 is attached to a wrist part of the robot 1. The robot 1 includes a robot driving device 1a which has a motor driving an arm and the wrist part. The configuration of the robot 1 is not limited to this, and any robot which can move the operation tool 2 can be adopted.

The operation tool 2 removes the burr by bringing a tool 7 into contact with an edge part of the workpiece 41. The tool 7 functions as a rotary member which rotates about the central axis of the tool 7. The operation tool 2 includes an operation tool driving device 2a which drives the tool 7. The operation tool driving device 2a includes a motor which rotates the tool 7.

The first robot device 71 is provided with a robot control device 3. The robot control device 3 includes an arithmetic processing unit (computer), which has a CPU (Central Processing Unit) as a processor, a RAM (Random Access Memory) connected to the CPU via a bus line, and a ROM (Read Only Memory) connected to the CPU via a bus line. An operation program in which the motion of the robot 1 is set is input to the robot control device 3. The robot control device 3 has a storage unit 3b which stores the operation program, etc. The robot control device 3 has a motion control unit 3a which transmits a motion command for driving the robot 1 and the operation tool 2 based on the operation program. The motion control unit 3a transmits the motion command for driving the robot driving device 1a and the operation tool driving device 2a. The robot driving device 1a and the operation tool driving device 2a are driven in accordance with the motion command.

The robot system in the present embodiment is provided with the teaching device 10 which generates a trajectory of the robot 1. The teaching device 10 in the present embodiment has a function for generating teaching points of the robot 1, and a function for generating an operation program of the robot 1 based on the generated teaching points.

The teaching device 10 includes an arithmetic processing unit (computer) which includes a CPU, a RAM, a ROM, etc. The teaching device 10 is provided with a storage unit 17 which stores the information on teaching points and the information on the operation program. The teaching device 10 is provided with an input part 15 by which the operator inputs any information. The input part 15 can include a keyboard, a mouse, etc. Further, the input part 15 may be formed so as to obtain information from an outside device via a communication device. The teaching device 10 includes a display part 16 which displays, for example, the information on teaching points and the information on the operation program. The display part 16 can includes any display panel such as a liquid-crystal display panel.

The teaching device 10 in the present embodiment is provided with a start point setting unit 12 which sets a start point of the trajectory of the robot 1 in the workpiece 41 displayed on the display part 16, and an end point setting unit 13 which sets an end point of the trajectory of the robot 1 in the workpiece 41 displayed on the display part 16. The teaching device 10 is provided with a trajectory generating unit 11 which generates a trajectory of the robot 1. The trajectory generating unit 11 generates the trajectory of the robot 1 based on the start point of the trajectory and the end point of the trajectory. The teaching device 10 is provided with a determination unit 18 which determines the advance direction of the operation tool 2 with respect to the workpiece 41, with regard to the trajectory of the robot 1 which is generated by the trajectory generating unit 11. Further, the teaching device 10 is provided with a correction unit 19 which corrects the trajectory of the robot 1. Additionally, the teaching device 10 is provided with an operation program generating unit 14, which generates an operation program for the robot 1 and the operation tool 2 based on the generated trajectory of the robot 1.

Figure 3:
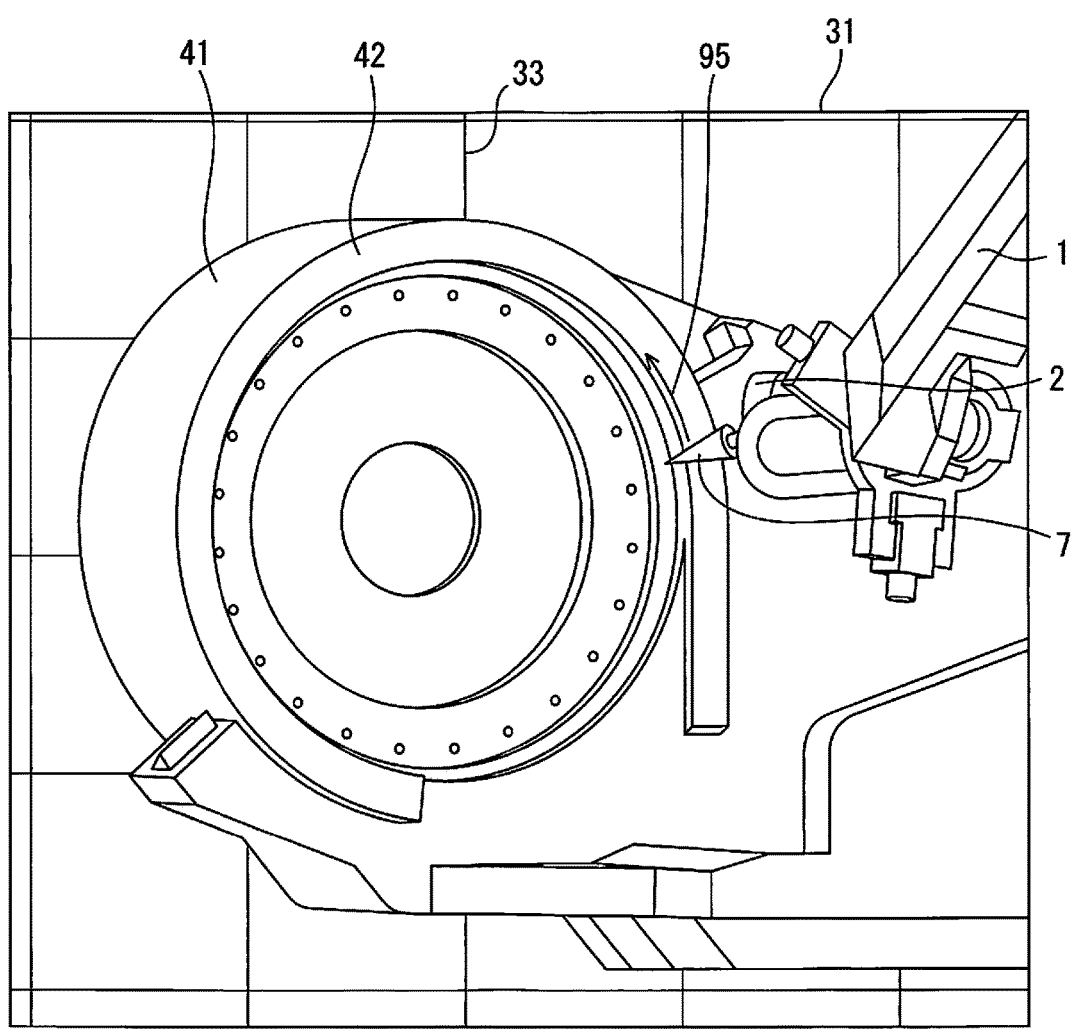
FIG. 3 is a first image displayed on a display part of a teaching device.

FIG. 3 shows a first image displayed on the display part of the teaching device. With reference to FIGS. 1 to 3, the operator previously inputs a three-dimensional model 21 of the workpiece 41 to the teaching device 10. Further, the operator previously inputs three-dimensional models 21 of the robot 1 and the operation tool 2. For example, the three-dimensional shape data which is generated in a CAD (Computer Aided Design) device can be used as the three-dimensional models 21. Alternatively, the teaching device 10 may obtain a stereoscopic three-dimensional model by causing a three-dimensional camera to image an actual workpiece 41 etc. Alternatively, the teaching device 10 may generate the three-dimensional models in the teaching device 10 by using a plurality of two-dimensional drawing data which is formed in the CAD device, etc.

The storage unit 17 stores the three-dimensional models 21 which have been input. The display part 16 can display images of the workpiece 41, the robot 1, and the operation tool 2 based on the three-dimensional models 21. Note that the display part in the present embodiment displays the three-dimensional image, but is not limited to this configuration, and may display a two-dimensional image.

In a first image 31, a state in which the workpiece 41 is machined by the robot 1 and the operation tool 2 is displayed. Further, in the first image 31, an auxiliary line 33 is displayed. The workpiece 41 in the present embodiment includes a protrusion part 42 which projects from the main body part of the workpiece 41. The protrusion part 42 is formed so as to elongate. Further, the protrusion part 42 is formed along a recessed portion which is formed in the main body part of the workpiece 41.

The burr is generated when, for example, the hole is generated in the workpiece by a drill, or the workpiece is cut by an end mill. The protrusion part 42 in the present embodiment is formed by cutting. When the periphery of the protrusion part 42 is cut, the burr is generated at an edge part of the protrusion part 42. The robot device 71 in the present embodiment performs an operation in which the burr occurred at the edge part of the protrusion part 42 is removed. The robot 1 moves the operation tool 2 so that the tool 7 moves along the edge part of the protrusion part 42 as designated by arrow 95.

Figure 4:
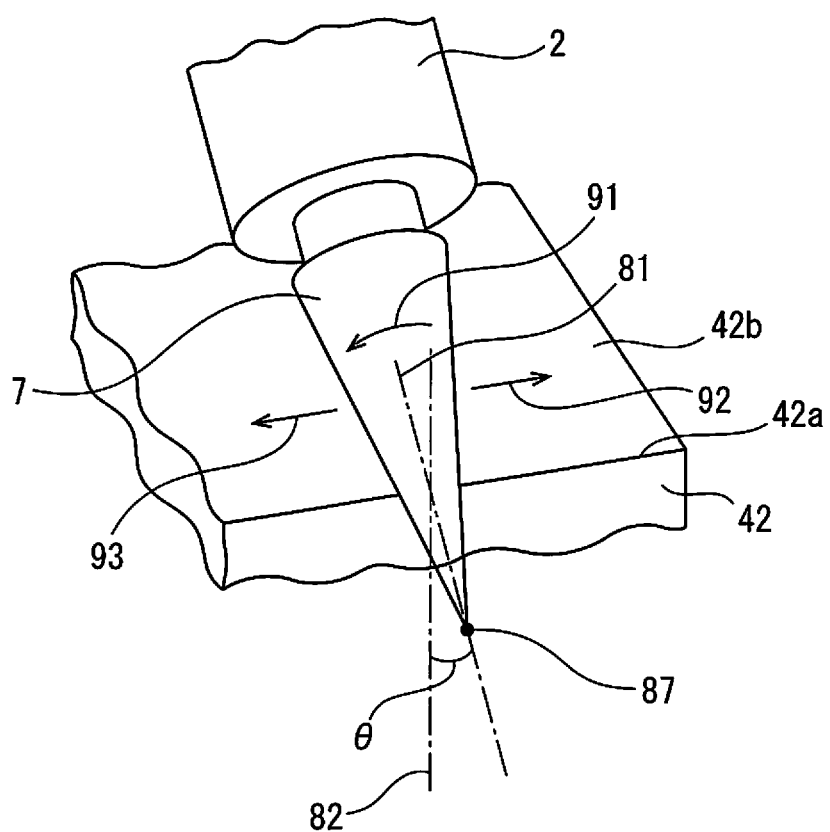
FIG. 4 is an enlarged perspective view of a tool attached to an operation tool and an edge part of a workpiece.

FIG. 4 is an enlarged perspective view of a tool of the operation tool and the edge part of the workpiece in the present embodiment. Small protrusions and recesses (burr) occur at an edge part 42a of the protrusion part 42. The tool 7 rotates about a central axis 81 of the tool 7 as designated by arrow 91. The tool 7 which is rotating comes into contact with the edge part 42a, whereby the burr generated at the edge part 42a can be removed.

The trajectory of the robot 1 is, for example, a path through which a tool center point 87 of the tool 7 passes. For example, points through which the tool center point 87 of the tool 7 passes are set as teaching points. In the present embodiment, the trajectory of the robot 1 has a shape corresponding to the shape of a portion to be machined. The trajectory of the robot 1 has a shape along the edge part 42a of the workpiece 41.

In the meantime, when the burr is removed, as a direction for moving the tool 7 with respect to the workpiece 41, there are a direction designated by arrow 92 and a direction designated by arrow 94. A cutting method in which the tool 7 travels in a direction for discharging chips as designated by arrow 92 is referred to as "up-cut". On the contrary, a cutting method in which the tool 7 travels in a direction opposite to the direction for discharging chips as designated by arrow 93, is referred to as "down-cut".

When the burr is removed, if the advance direction of the tool 7 with respect to the workpiece 41 differs depending on the tool 7, the effect of removing the burr may differ. Alternatively, the up-cut or the down-cut may be assigned to the tool 7. For example, the tool 7 shown in FIG. 4 is assigned so as to remove the burr by the down-cut designated by arrow 93. Alternatively, the operation tool for removing the burr may include a brush. The rotating brush comes into contact with the edge part and is moved, whereby the burr can be removed. In the case of the operation tool including such a brush, it may be preferable that the burr is removed by the up-cut.

The advance direction of the operation tool 2 with respect to the workpiece 41 is predetermined in accordance with the kind of a tool to be used and the rotational direction of the tool. Further, it is preferable to relatively move the operation tool 2 with respect to the workpiece 41 in the predetermined advance direction of the operation tool 2. However, when the trajectory of the robot 1 is generated, the advance direction of the operation tool 2 may be undesired. The teaching device 10 in the present embodiment performs a control for reversing the advance direction when the advance direction of the operation tool 2 with respect to the workpiece 41 is different from the desired direction.

Figure 5:
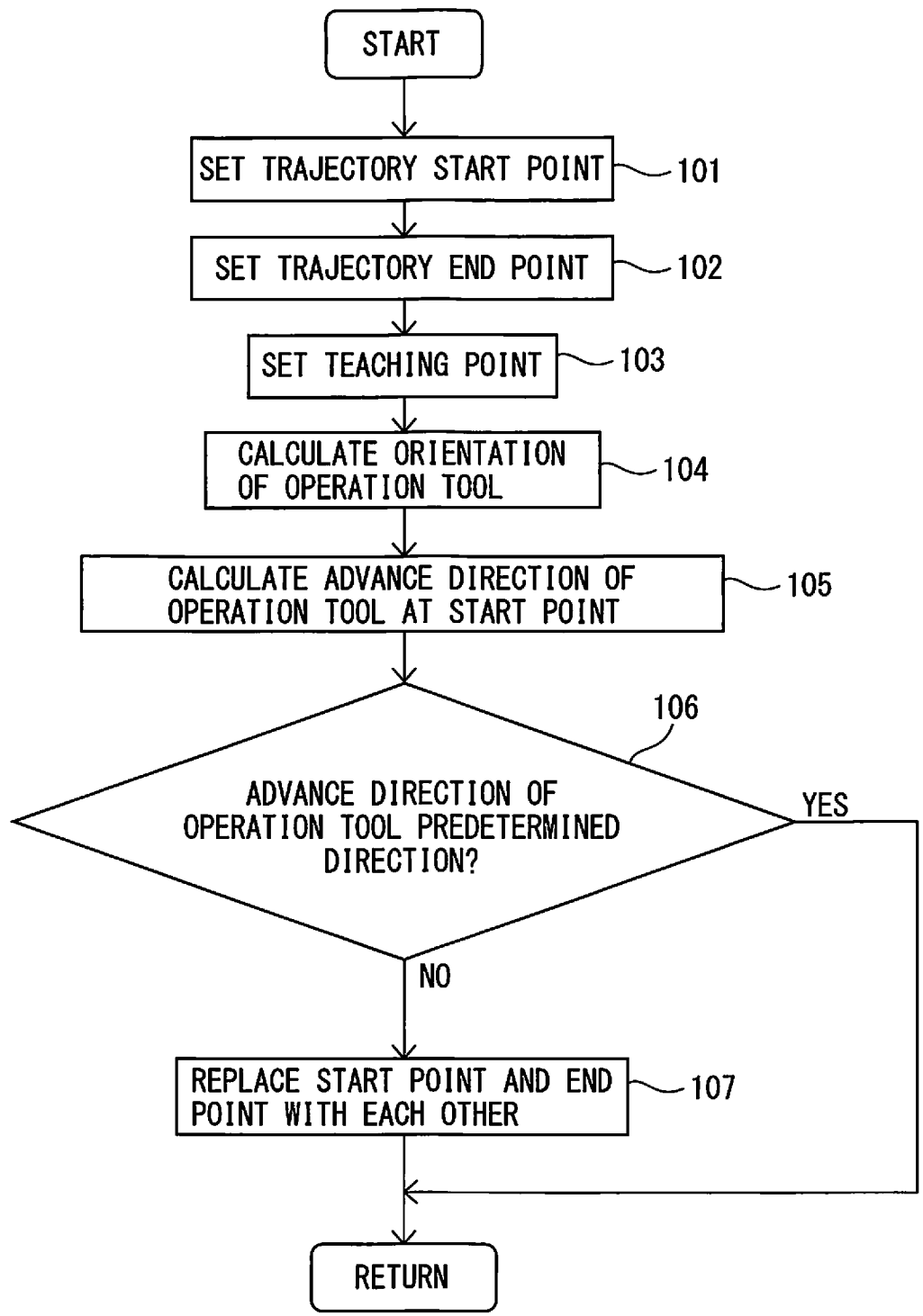
FIG. 5 is a flowchart of control for generating a trajectory in the embodiment.
Figure 6:
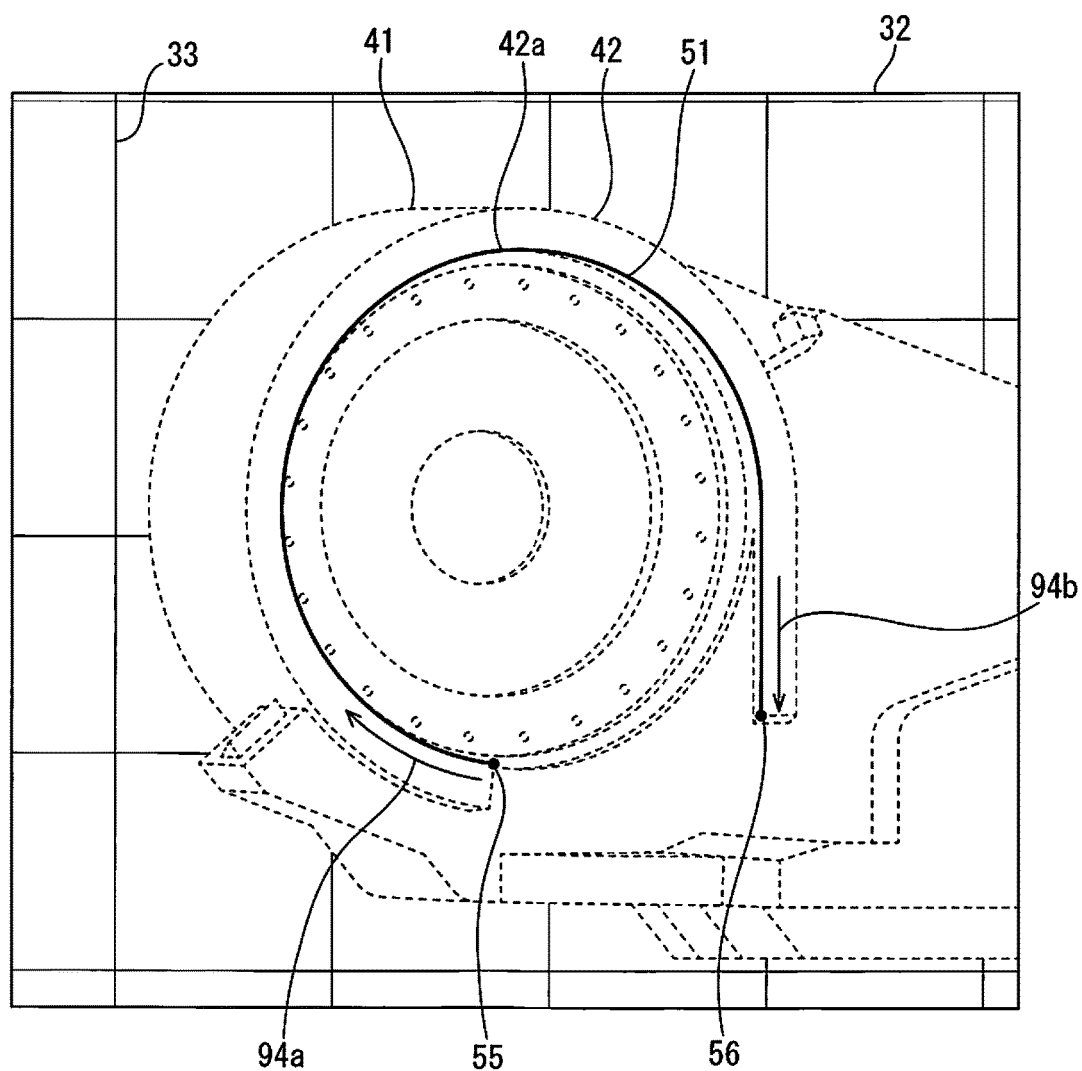
FIG. 6 is a second image displayed on the display part when the trajectory is set.

FIG. 5 shows a flowchart of the control process for generating the robot trajectory in the present embodiment. FIG. 6 shows a second image displayed on the display part when the robot trajectory is generated. In a second image 32, the workpiece 41 is depicted by a dashed line. A trajectory 51 of the robot 1, which is to be generated, is depicted by a solid line. In this example, in the protrusion part 42 of the workpiece 41, a trajectory for removing the burr formed at the inner edge part 42a is generated. Note that the workpiece 41 is depicted with a dashed line in the second image 32, and the trajectory 51 of the robot 1 is depicted with a solid line, but the embodiment is not limited to this. The workpiece 41 and the trajectory of the robot 1 can be depicted by any method. For example, the display part can depict the workpiece and the trajectory by different colors.

With reference to FIGS. 2, 5, and 6, the display part 16 displays the workpiece 41 based on the three-dimensional model 21 which has been input. At step 101, the operator designates a start point 55 of the trajectory in the workpiece 41. The operator designates the start point 55 of the trajectory on the screen by operating a mouse, etc. of the input part 15. The start point setting unit 12 sets the start point 55 of the trajectory of the robot 1 in the workpiece 41 displayed on the display part 16. For example, the start point setting unit 12 can set the start point 55 by a coordinate value of a predetermined coordinate system.

Subsequently, at step 102, the operator designates the end point 56 of the trajectory in the workpiece 41. The operator designates the end point 56 of the trajectory on the screen by operating the mouse, etc. of the input part 15. The end point setting unit 13 sets the end point 56 of the trajectory of the robot 1 in the workpiece 41 displayed on the display part 16.

For example, the end point setting unit 13 can set the end point 56 by a coordinate value of a predetermined coordinate system.

Subsequently, at step 103, the trajectory generating unit 11 generates the trajectory of the robot 1. The trajectory generating unit 11 in the present embodiment has a function for detecting a ridge line of the workpiece 41. The trajectory generating unit 11 can detect the ridge line which extends from the start point 55 to the end point 56. Further, the trajectory generating unit 11 can display the ridge line extending from the start point 55 to the end point 56 as the trajectory 51 of the robot 1. In FIG. 6, the trajectory 51, along which the tool 7 moves from the start point 55 as designated by arrow 94a, and moves to the end point 56 as designated by arrow 94b, is depicted.

Subsequently, the trajectory generating unit 11 sets teaching points based on the trajectory 51 of the robot 1. The trajectory generating unit 11 sets points on the trajectory 51 of the robot 1 as teaching points. For example, a plurality of teaching points is generated from the start point 55 to the end point 56 based on the intervals which the operator sets in advance. The intervals between the teaching points can be freely set. For example, when the trajectory is a straight line, a start point and an end point of the straight line can be set at the teaching points. When the trajectory is a curved line, the teaching points can be set while the intervals between teaching points are set to be short.

Here, with reference to FIG. 4, in the present embodiment, the ridge line which is set as a trajectory of the robot 1 corresponds to the edge part 42a. On the other hand, a side surface of the tool 7 is in contact with the edge part 42a, and the tool center point 87 of the tool 7 is apart from the edge part 42a. The position of the ridge line and the position of the tool center point 87 of the tool 7 do not coincide with and apart from each other. Thus, the trajectory generating unit 11 can perform a correction in which a plurality of teaching points generated on the ridge line are moved toward the tool center point 87. Further, the trajectory generating unit 11 can generate a trajectory of the robot 1, through which the tool center point 87 passes. In other words, the trajectory generating unit 11 can offset the start point, the end point, and teaching points on the ridge line so as to generate the teaching points through which the tool center point 87 passes.

Subsequently, at step 104, the trajectory generating unit 11 calculates an orientation of the operation tool 2 with respect to the workpiece 41. With reference to FIG. 4, the orientation of the tool 7 with respect to the workpiece 41 is predetermined. The orientation of the tool 7 corresponds to the orientation of the operation tool 2. The orientation of the operation tool 2 can be set by an inclination of the central axis 81 with respect to a predetermined direction. In the present embodiment, the angle θ of the central axis 81 with respect to a reference line 82 perpendicular to a top surface 42b of the protrusion part 42 corresponds to the inclination of the operation tool 2. The trajectory generating unit 11 sets the orientation of the operation tool 2 so that the angle θ is a predetermined angle. Further, the trajectory generating unit 11 sets the orientation of the operation tool 2 so that the direction in which the edge part 42a extends and the direction in which the central axis 81 extends are perpendicular to each other. The trajectory generating unit 11 calculates the orientation of the operation tool 2 at the position of each teaching point. As seen above, the setting of the trajectory of the robot 1 includes the setting of the position of teaching points (the setting of the position of the tool center point 87) and the setting of the orientation of the operation tool 2.

Subsequently, at step 105, the determination unit 18 calculates the advance direction of the operation tool 2 at the start point 55. At step 106, the determination unit 18 determines whether or not the advance direction of the operation tool 2 with respect to the rotational direction of the tool 7 is a predetermined direction (reference direction). With reference to FIG. 4, when the tool 7 rotates in a direction designated by arrow 91, it is determined whether the advance direction of the operation tool 2 is the direction designated by arrow 93. In other words, the determination unit 18 determines whether or not the burr is removed by the down-cut in the trajectory which has been set.

Note that the advance direction of the operation tool 2 with respect to the workpiece 41 corresponds to the direction in which the trajectory extends from the start point 55. Thus, the determination unit 18 may determine the advance direction of the operation tool 2 based on the direction in which the trajectory extends from the start point 55.

At step 106, when the advance direction of the operation tool 2 is not a predetermined direction, the control process is shifted to step 107. In other words, when the advance direction of the operation tool 2 is a direction opposite to the reference direction, the control process is shifted to step 107. For example, with reference to FIG. 4, when the operation tool 2 travels in the up-cut direction designated by arrow 92, it can be determined that the advance direction is the direction which is opposite to the predetermined direction.

Figure 7:
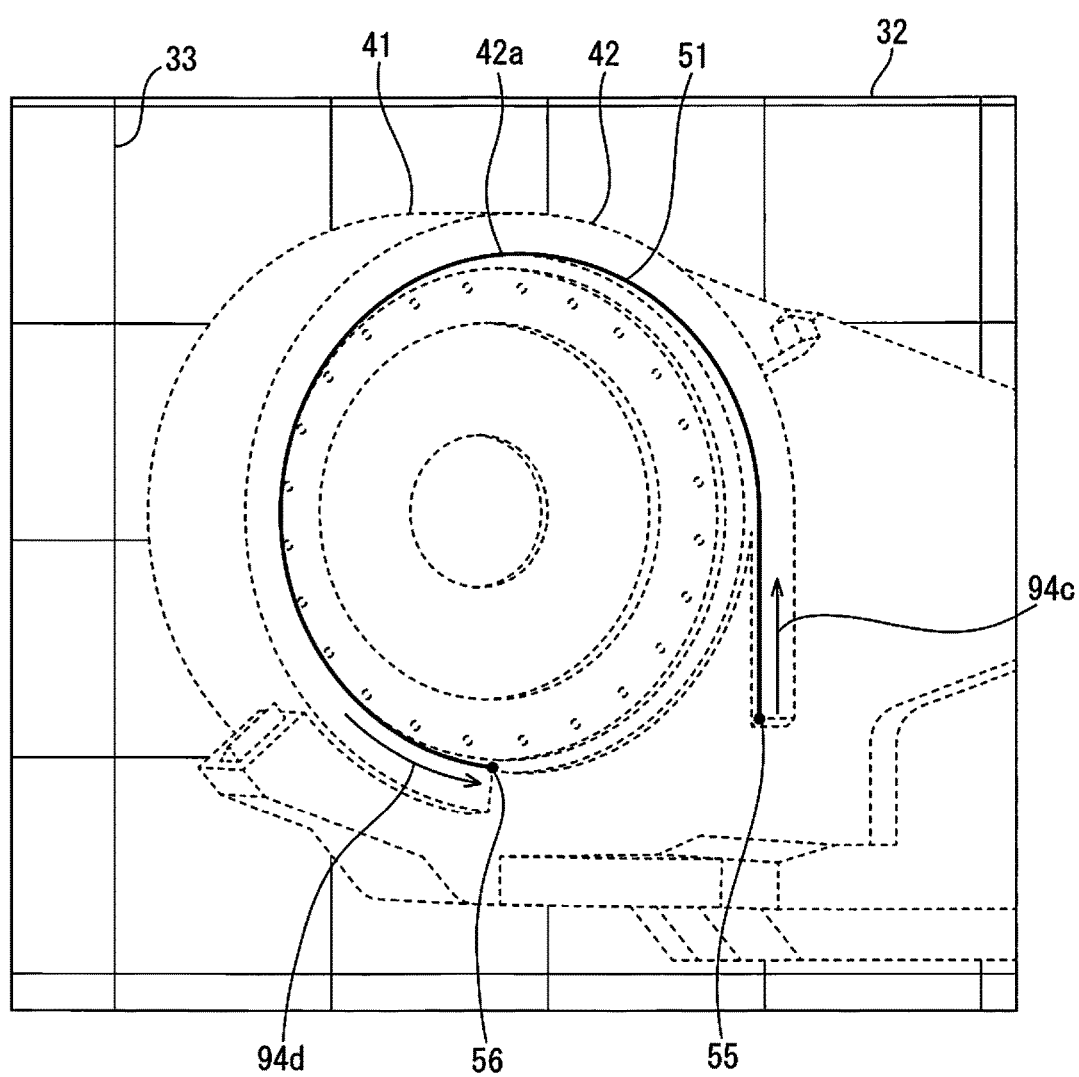
FIG. 7 is a second image displayed on the display part when the trajectory is corrected.

At step 107, the correction unit 19 replaces the start point 55 and the end point 56 with each other in the trajectory 51. For example, with reference to FIG. 6, the position of the start point 55 and the position of the end point 56 are replaced with each other in the trajectory 51 of the protrusion part 42. FIG. 7 shows an image which is obtained after the start point and the end point of the trajectory are replaced with each other. The replacement of the start point 55 and the end point 56 of the trajectory 51 causes the advance direction of the operation tool 2 with respect to the workpiece 41 to reverse. Then, the trajectory 51 which extends from the start point 55 as designated by arrow 94*c* and extends to the end point 56 as designated by arrow 94*d* is generated. Note that, when the direction in which the trajectory 51 extends is corrected, the correction unit 19 can change the order of a plurality of teaching points. The position of the teaching points which have been set within a section from the start point 55 to the end point 56 and the orientation of the operation tool can be used without change.

As seen above, when the advance direction of the operation tool 2 is opposite to the desired direction, the correction unit 19 performs a control so that the start point 55 and the end point 56 of the trajectory 51 are replaced with each other. The replacement of the start point 55 and the end point 56 of the trajectory 51 enables the advance direction of the operation tool 2 with respect to the workpiece 41 to be corrected to the desired advance direction.

With reference to FIG. 5, at step 106, when the advance direction of the operation tool 2 is a predetermined direction, this control process ends. Thus, the trajectory of the robot 1 can be generated.

With reference to FIG. 2, the operation program generating unit 14 of the teaching device 10 can generate the operation program based on the generated trajectory of the robot 1. The operation program which is generated by the operation program generating unit 14 is input to the robot control device 3. The motion control unit 3*a* of the robot control device 3 can drive the robot driving device 1*a* and the operation tool driving device 2*a* based on the operation program. As seen above, an actual operation can be performed by the robot device 71.

The teaching device 10 in the present embodiment can automatically detect an error and correct the trajectory even if the operator reversely sets the start point and the end point of the trajectory of the robot 1. This prevents the workpiece from being machined in the advance direction of the operation tool with respect to the workpiece, which is different from the desired direction. Further, when the operator finds the error in the advance direction after the operation program is created, an operation for reproducing the robot trajectory can be avoided.

Figure 8:
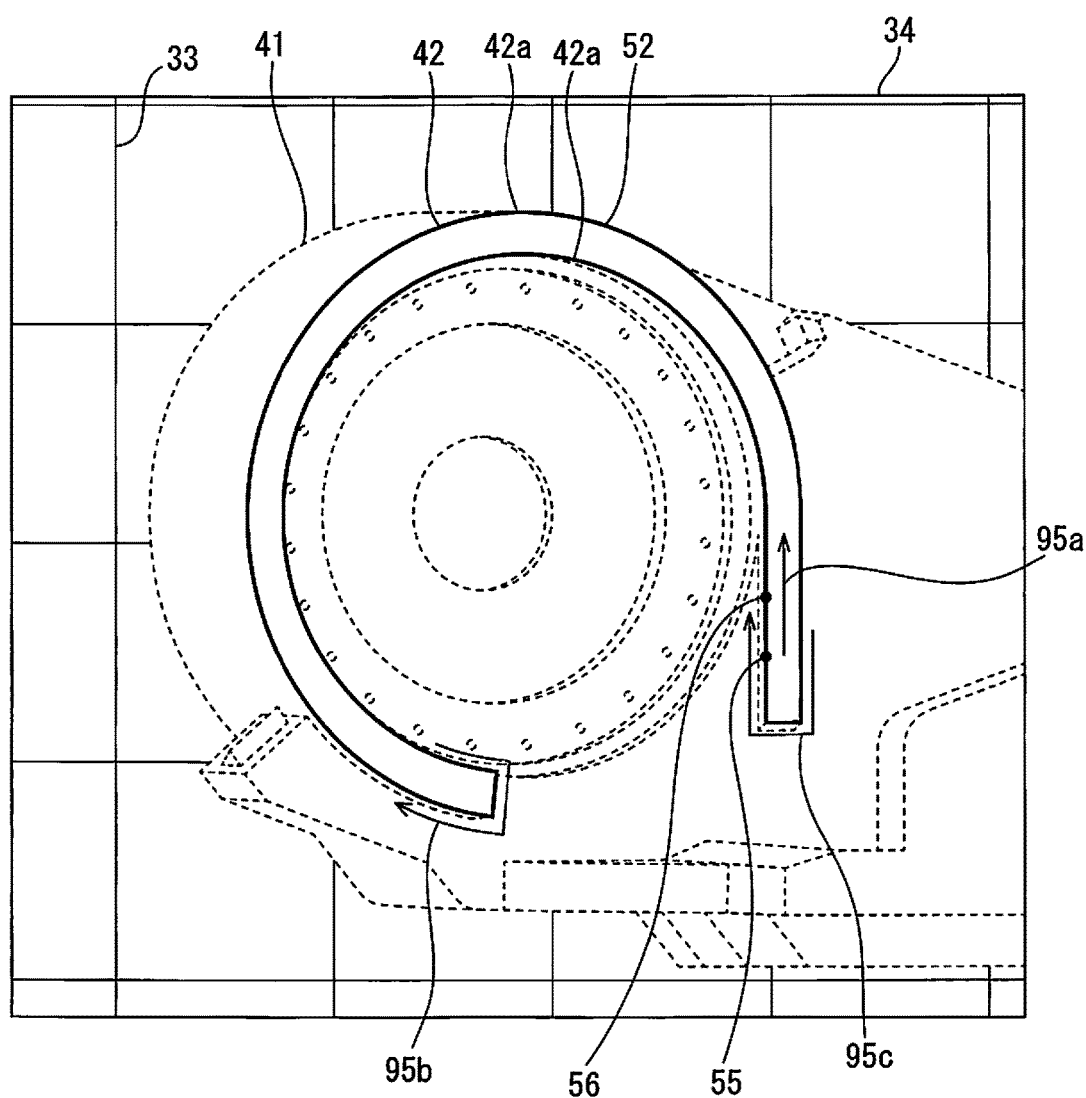
FIG. 8 is a third image displayed on the display part when the trajectory is set.

FIG. 8 shows a third image displayed on the display part in the present embodiment. The trajectory generating unit 11 in the present embodiment has a function for detecting an annular ridge line among the ridge lines of the workpiece 41. In other words, the trajectory generating unit 11 has a function for detecting a closed-loop ridge line.

In the third image 34, the operator selects a part of the ridge lines in the protrusion part 42, whereby the trajectory generating unit 11 can detect the closed-loop ridge line in the top surface of the protrusion part 42. Then, the display part 16 can display a trajectory 52 of the robot 1. Subsequently, the operator designates the start point 55 and the end point 56 on the screen. The start point setting unit 12 sets the start point of the trajectory, and the end point setting unit 13 sets the end point of the trajectory. The trajectory generating unit 11 can generate the trajectory 52 of the robot 1 based on the start point 55, the end point 56, and the ridge line.

The trajectory generating unit 11 generates the trajectory 52 along which the removal of the burr starts from the start point 55 as designated by arrow 95*a*. The trajectory 52 extends along the inner edge part of the protrusion part 42, and then changes direction along the shape of the protrusion part 42 as designated by arrow 95*b*. After that, the trajectory 52 extends along the outer edge part of the protrusion part 42. The trajectory 52 extends along the outer edge part of the protrusion part 42, and then changes direction along the shape of the protrusion part 42 as designated by arrow 95*c*. Then, the trajectory 52 extends to the end point 56.

As seen above, the trajectory generating unit 11 may automatically detect the ridge line and generate the trajectory 52 of the robot 1 along the ridge line from the start point to the end point. This configuration eliminates the necessity that the operator sets a plurality of teaching points in the middle of the trajectory, and enables the robot trajectory to be easily created.

In the aforementioned control for removing the burr, the operator designates the start point and the end point. However, the control is not limited to this embodiment. The start point setting unit 12 may automatically set the start point, and the end point setting unit 13 may automatically set the end point. For example, with reference to FIG. 8, when one closed-loop ridge line is selected, the start point setting unit 12 can set any point on the ridge line as the start point. Further, the end point setting unit 13 can set any point after one lap of the ridge line as the end point.

Even in the control in which the trajectory generating unit 11 detects the annular ridge line, the determination unit 18 can determine the advance direction of the operation tool 2 with regard to the trajectory 52 of the robot 1. Further, when the advance direction of the operation tool 2 is different from the predetermined direction, the correction unit 19 can correct the trajectory by replacing the start point 55 and the end point 56 with each other in the trajectory 52 of the robot 1.

In the above embodiment, the determination unit 18 determines the advance direction of the operation tool 2 at the start point 55 of the trajectory, but is not limited to this configuration. The determination unit 18 can determine the advance direction of the operation tool 2 at any point on the trajectory. Alternatively, the determination unit 18 may determine the advance direction of the operation tool 2 at a plurality of points.

Figure 9:
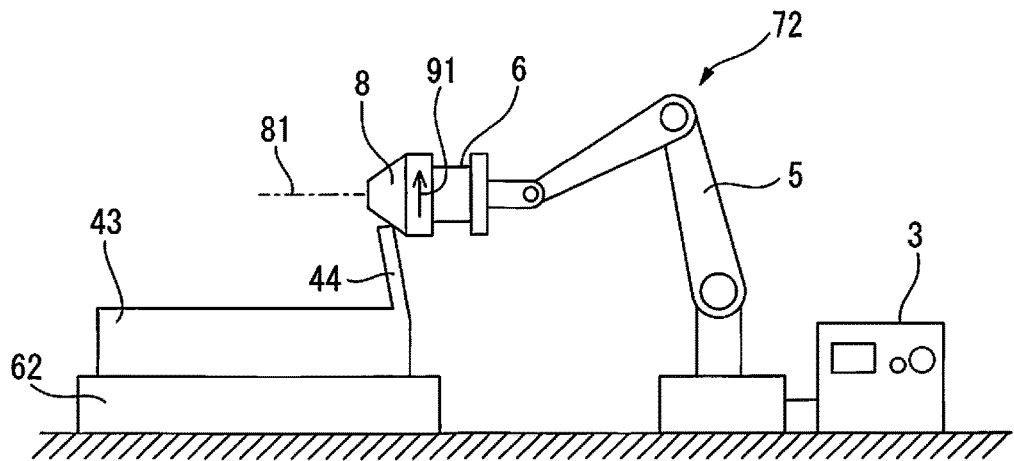
FIG. 9 is a schematic side view of a second robot device in the embodiment.

FIG. 9 shows a schematic side view of a second robot device in the present embodiment. A second robot device 72 is provided with a robot 5 and an operation tool 6. The robot 5 is controlled by the robot control device 3. The operation tool 6 includes a roller 8 as a rotary member which rotates about the central axis 81. The roller 8 is supported so as to freely rotate. The second robot device 72 performs a roller hemming process. A process for bending a plate member is referred to as "hemming process". The roller hemming process is a hemming process in which the roller is pressed against an edge of the plate member in order to bend the plate member.

A workpiece 43 is secured to a pedestal 62. The workpiece 43 includes a plate-like part 44 formed in a plate shape. In the robot 5, the roller 8 is pressed against the plate-like part 44 of the workpiece 43, whereby the plate-like part 44 is bent. In another teaching device in the present embodiment, a trajectory of such a robot 5 is generated.

Figure 10:
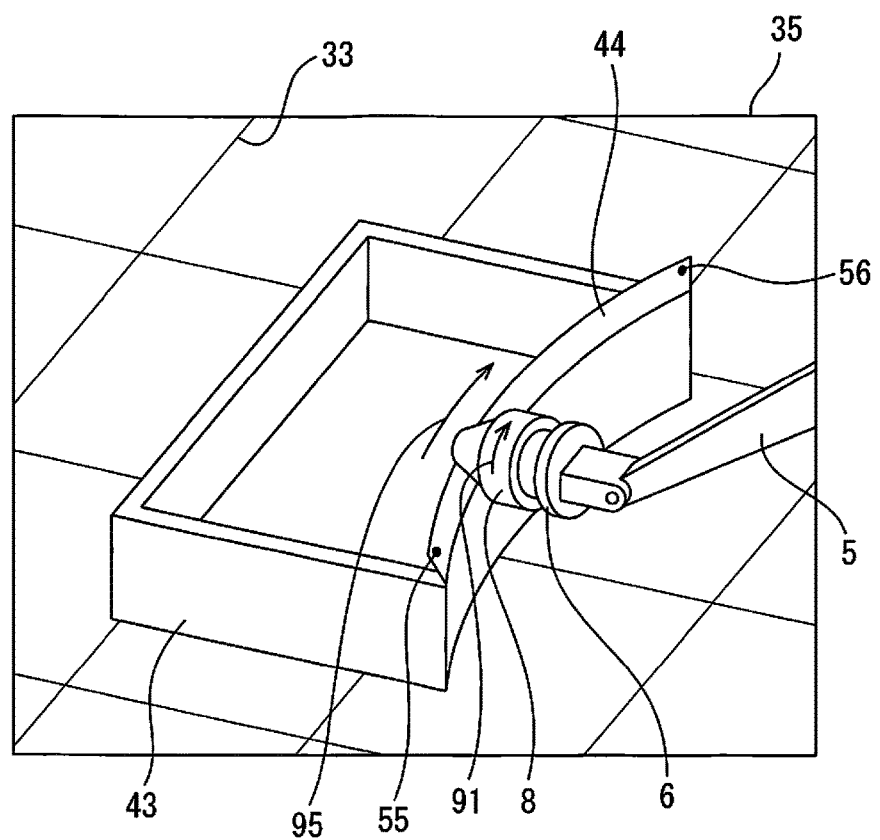
FIG. 10 is a fourth image displayed on the display part of the teaching device.

FIG. 10 shows a fourth image displayed on a display part of a teaching device. In a fourth image 35, a perspective view of the workpiece 43, the operation tool 6 including the roller 8, and the robot 5 is displayed. The robot 5 causes the roller 8 to move as designated by arrow 95 while the roller 8 is pressed against the workpiece 43. The roller 8 moves in the direction in which the plate-like part 44 extends. The plate-like part 44 is bent by being pressed by the roller 8. The rotational direction of the roller 8 which is pressed against the plate-like part 44 is predetermined. In this example, the roller 8 is set to rotate in the direction designated by the arrow 91 when pressing the plate-like part 44.

The operator can designate the start point 55 and the end point 56 in the image 35. Further, the operator can designate teaching points between the start point 55 and the end point 56. The start point setting unit 12 sets a trajectory start point based on the start point 55 designated by the operator. The end point setting unit 13 sets a trajectory end point based on the end point 56 designated by the operator. Then, the trajectory generating unit 11 generates the trajectory of the robot 5 based on the start point 55, the end point 56, and the teaching points.

Subsequently, the determination unit 18 determines whether or not the advance direction of the operation tool 6 is a predetermined direction. In other words, the determination unit 18 determines whether or not the rotational direction of the roller 8 is a predetermined direction. When the advance direction of the operation tool 6 is different from the predetermined direction, the correction unit 19 conducts the control for replacing the start point 55 and the end point 56 of the trajectory with each other. Then, the correction unit 19 generates a new trajectory of the robot 1.

As seen above, even in the teaching device which generates the trajectory in the robot device for performing the roller hemming process, the control process according to the present embodiment can be applicable.

In the above embodiment, the robot device for removing the burr of the workpiece, and the robot device for bending the part of a workpiece are described as examples, but the embodiment is not limited to this. The control in the present embodiment can be applied to the teaching device of the robot to which any operation tool including a rotary member which rotates about the central axis is attached.

According to an aspect of this disclosure, the teaching device of the robot, which corrects the advance direction of the operation tool when the advance direction of the operation tool is different from the desired direction, can be provided.

In each control process described above, the order of steps can be appropriately changed in a range where the function and the effect are not changed.

The aforementioned embodiments can be appropriately combined. In each figure described above, the same or equivalent portions are designated by the same reference numeral. Note that the aforementioned embodiments are described as examples, and do not limit the invention. Further, in the embodiments, modifications of the features shown in the claims are included.

The invention claimed is:

1. A robot teaching device for generating a trajectory of a robot, to which an operation tool including a roller rotating about a central axis is attached, the robot being formed to change position and orientation so as to bend a plate-like part by moving the roller while the roller is pressed against an edge of the plate-like part of a workpiece, the robot teaching device being offline and comprising:
   a display part displaying the workpiece including the plate-like part;
   a start point setting unit setting a start point of a trajectory of the robot with respect to the plate-like part displayed on the display part;
   an end point setting unit setting an end point of the trajectory of the robot with respect to the plate-like part displayed on the display part;
   a trajectory generating unit generating the robot trajectory of the robot based on the start point and the end point;
   a determination unit determining an advance direction of the operation tool with respect to the workpiece; and
   a correction unit correcting the trajectory of the robot, wherein
   a rotational direction of the roller when the roller is moved while the edge of the plate-like part is pressed by the roller is predetermined,
   the determination unit determines whether or not the rotational direction of the roller is a predetermined direction with respect to the advance direction, and
   the correction unit corrects the trajectory of the robot by replacing the start point and the end point with each other when the rotational direction of the roller is different from the predetermined direction.

* * * * *